United States Patent

Maeno et al.

[11] Patent Number: 4,803,504
[45] Date of Patent: Feb. 7, 1989

[54] WATERPROOF CAMERA

[75] Inventors: Hiroshi Maeno; Hideo Tamamura, both of Tokyo, Japan

[73] Assignee: Canon Kabushiki Kaisha, Tokyo, Japan

[21] Appl. No.: 136,477

[22] Filed: Dec. 23, 1987

Related U.S. Application Data

[63] Continuation of Ser. No. 772,147, Sep. 3, 1985, abandoned.

[30] Foreign Application Priority Data

Sep. 3, 1984 [JP]  Japan .................... 59-132682
Sep. 3, 1984 [JP]  Japan .................... 59-132683
Sep. 3, 1984 [JP]  Japan .................... 59-132684

[51] Int. Cl.$^4$ ........................................... G03B 17/08
[52] U.S. Cl. ........................................................ 354/64
[58] Field of Search ................................. 354/64, 288

[56] References Cited

U.S. PATENT DOCUMENTS

| | | | |
|---|---|---|---|
| 2,944,474 | 7/1960 | Dennis | 354/64 |
| 4,295,721 | 10/1981 | Rebikoff | 354/64 |
| 4,375,323 | 3/1983 | Inagaki et al. | 354/64 |
| 4,383,743 | 5/1983 | Nozawa et al. | 354/64 |

Primary Examiner—Donald Griffin
Attorney, Agent, or Firm—Toren, McGeady & Associates

[57] ABSTRACT

A waterproof camera has its body covered with a front cover and a back lid with camera mechanisms arranged within the body. The adhesion of the front cover and the back lid is improved to attain a waterproof effect with a packing carried jointly by the peripheral edges of the camera body and the front cover.

30 Claims, 8 Drawing Sheets

WATERPROOF CAMERA

This is a continuation of application Ser. No. 772,147 filed Sept. 3, 1985 and now abandoned.

Background of the Invention:

1. Field of the Invention:

This invention relates to a camera of a waterproof structure and more particularly to a structural arrangement having a packing carried between a cover and a lid.

Figure 1:
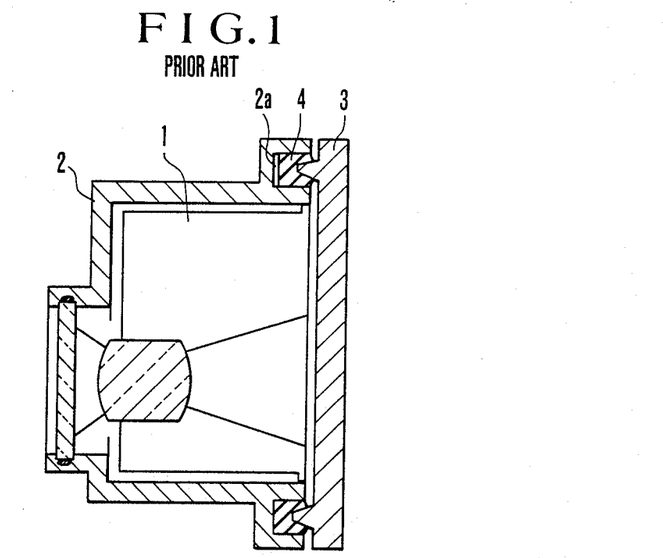
FIG. 1 is a sectional view schematically showing a waterproof camera as a first example of the waterproof arrangement of the prior art.

2. Description of the Prior Art:

FIG. 1 of the accompanying drawings shows a conventional packing carrying structure for a waterproof camera. A box shaped front cover 2 covers the front and peripheral surfaces of a camera body 1 which is provided with the mechanisms of the camera. The front cover 2 is provided with a rear aperture. A packing receiving recess 2a is formed along the peripheral edge of the aperture in an outwardly protrudent manner. A back lid 3 is pivotally carried by the front cover 2. When the back lid 3 is closed, water-tightness is attained by virtue of a packing 4 with which the recess 2a is filled. However, the outwardly protrudent arrangement of the recess 2a causes an increase in the outside dimensions of the camera.

Figure 2:
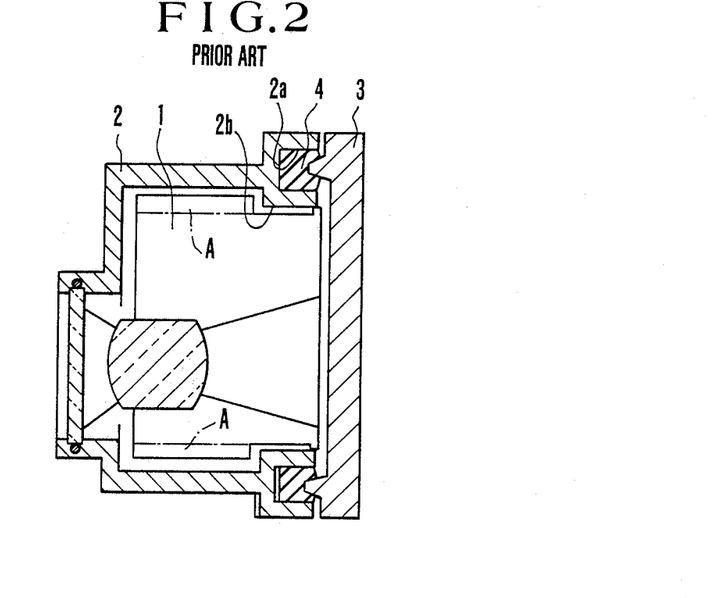
FIG. 2 is a sectional view schematically showing a waterproof camera as a second example of the prior art.

The outside dimensions of the camera may be made smaller with the packing receiving recess 2a arranged to protrude not only outwardly but also inward from the side wall of the front cover 2 as shown in FIG. 2. The arrangement, however, results in a stepped part on the inside surface part 2b of the front cover 2. The stepped part then not only prevents the body 1 which includes a part A from being placed within the front cover 2 but also prevents the front cover 2 from being withdrawn from a mold in case that the cover 2 is to be formed by molding. Therefore, this arrangement is not practicable.

Figure 3:
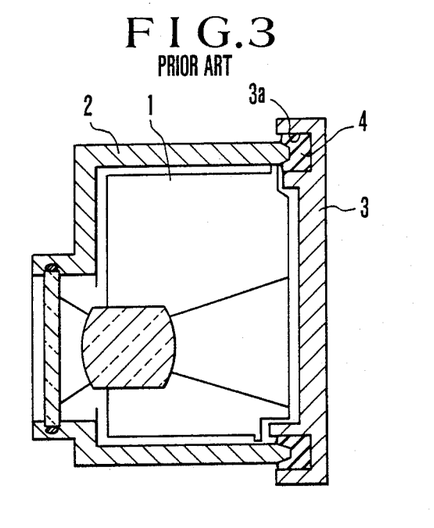
FIG. 3 is a sectional view schematically showing a waterproof camera as a third example of the waterproof arrangement of the prior art.

In another example of conventional arrangement which is shown in FIG. 3, the front cover 2 is provided with no packing receiving recess while a packing receiving recess 3a is formed along the inner peripheral part of the back lid 3. The recess 3a is filled with a packing 4. That arrangement, however, causes the back lid 3 to expand outward as much as the recess 3a while the front cover 2 becomes simple and smaller. The size of the camera becomes about the same as that of FIG. 2 by virtue of that arrangement. However, in case that the protrudent part resulting from that arrangement is inadvertently allowed to collide with something while the camera is in use, the packing carrying part is apt to momentarily open to cause a leak of water. Further, in accordance with the conventional waterproof structural arrangement of FIG. 2, if the front cover 2 is to be molded with a plastic material, the inner surface part 2b having the packing receiving recess 2a inwardly protrudes and the inward protrusion 2b makes the front cover 2 hardly moldable with a mold which is simply divided into male and female mold parts. This thus necessitates use of a more expensive mold.

Figure 4:
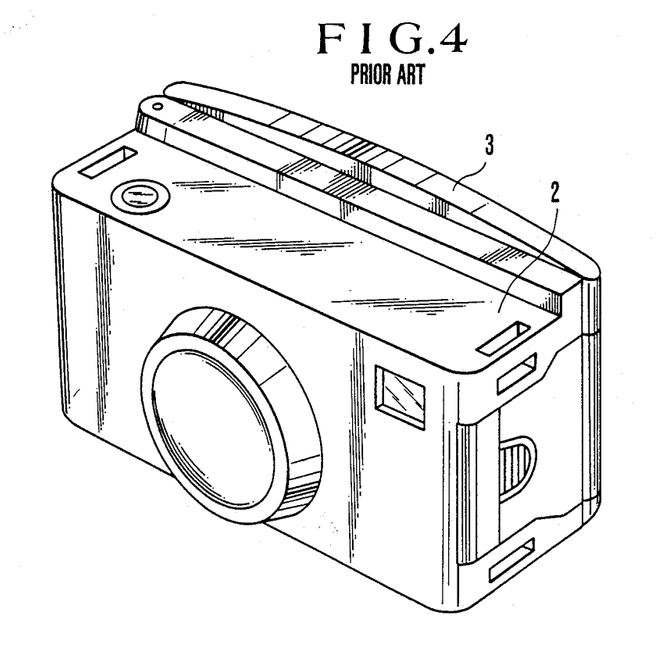
FIG. 4 is an oblique view showing the waterproof camera of FIG. 1 or FIG. 2 as in a state of being in service.

In addition to the disadvantages described above, another disadvantage of the waterproof cameras of FIGS. 1 and 2 resides in that: The back lid 3 sometimes warps as shown in FIG. 4 as it is overcome by the reaction of the packing. When the camera is in the water, the back lid 3 warps in a direction opposite to the direction shown in FIG. 4. The warping can be prevented by increasing the thickness of the back lid 3. However, the camera then becomes larger and heavier.

Figure 5:
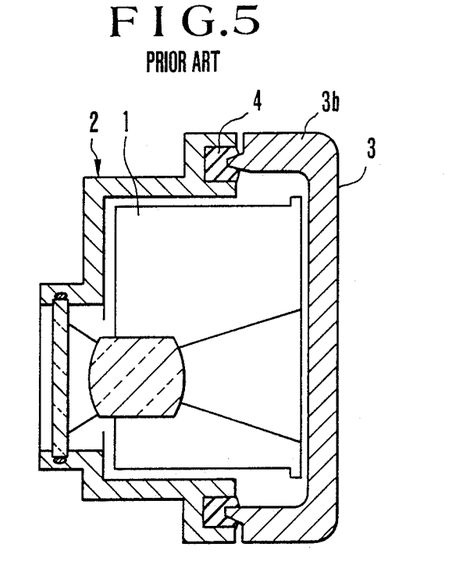
FIG. 5 is a sectional view schematically showing a waterproof camera as a fourth example of the waterproof arrangement of the prior art.

To solve this problem, it has been contrived to increase the rigidity of the back lid 3 without increasing the thickness of the back lid by arranging the camera as shown in FIG. 5. In this case, the depth of the front cover 2 is somewhat shortened while the peripheral part 3b of the back lid 3 is arranged to extend toward the front cover 2. However, that arrangement causes the mechanisms of the camera to be exposed to the outside when the back lid 3 is opened. Accordingly, the arrangement of the prior art has the following shortcoming: With the waterproof camera having been used underwater, when the back lid 3 is opened, a large amount of water drops would fall from around the packing 4. Then, the internal mechanisms disposed within the camera body 1 might be affected and damaged by the water. In the event of sea-water in particular, such a damage tends to become serious. This problem arises alike also with other examples of conventional waterproof arrangement shown in FIGS. 1, 2 and 3.

SUMMARY OF THE INVENTION

It is a principal object of this invention to provide a waterproof camera which is arranged to permit reduction in size of the whole camera.

The above and more specific objects and feature of the invention will become apparent from the following detailed description of preferred embodiments thereof taken in connection with the accompanying drawings.

DETAILED DESCRIPTION OF THE PREFERRED EMBODIMENTS

Figure 6:
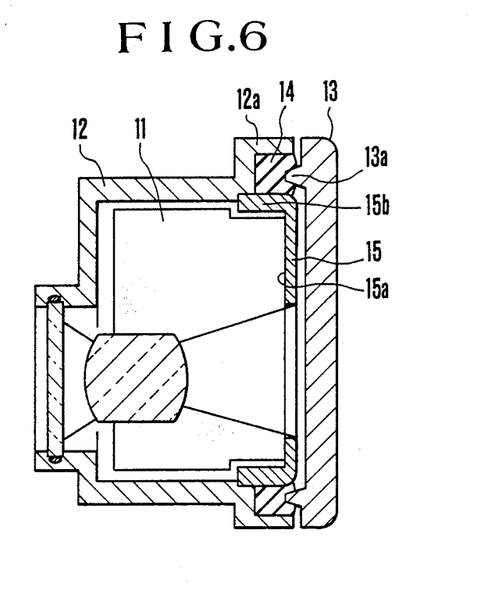
FIG. 6 is a sectional view showing a waterproof camera arranged according to this invention as a first embodiment of the invention.
Figure 7:
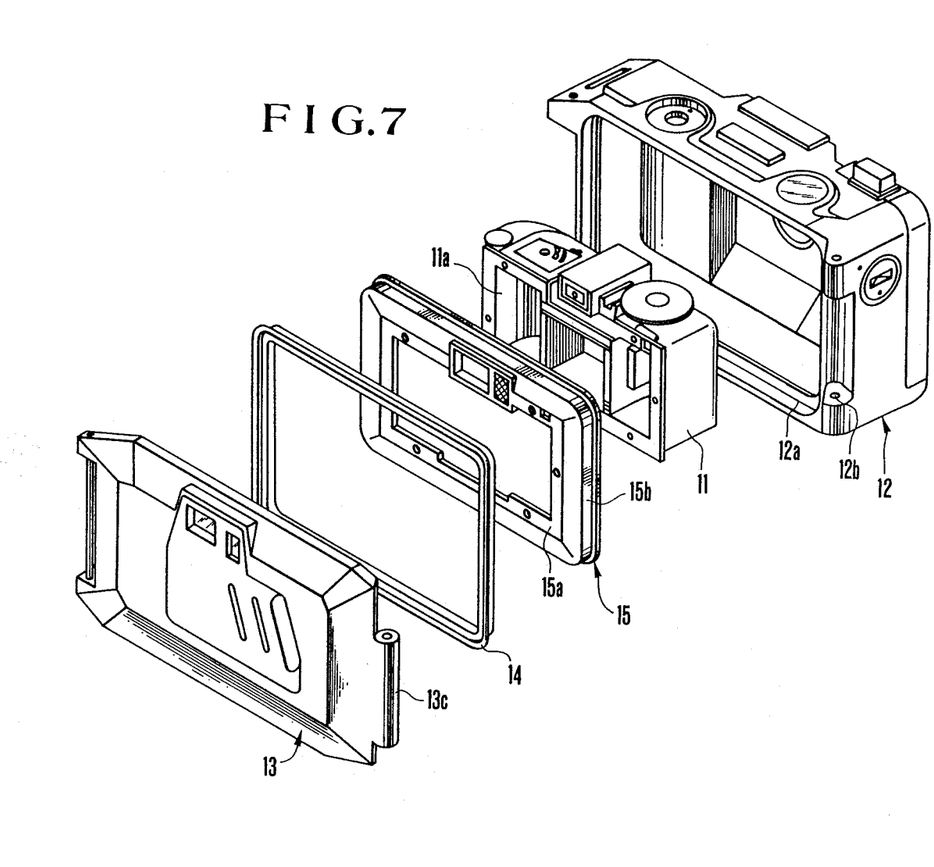
FIG. 7 is an exploded view of the waterproof camera shown in FIG. 6.

A waterproof camera embodying this invention as a first embodiment thereof is arranged as shown in FIGS. 6 and 7. Referring to these drawings, a camera body 11 includes the mechanisms and devices of the camera, such as a film loading chamber 11a, a shutter, exposure control means, etc. A front cover 12 is formed with a plastic material into a box-like shape and is arranged to waterproof the camera by covering the front and peripheral surfaces of the camera body 11. Although omitted from illustration, it is preferable to have the camera body 11 secured to the front cover by suitable means such as screws. A back lid 13 covers an aperture formed in the rear of the cover 12 also for the waterproofing purpose and is arranged to permit replacement work on a film which is not shown. A packing 14 is arranged at a junction between the waterproof front cover 12 and the back lid 13 to prevent water from entering the camera through the junction. A back cover 15 of the camera body 11 is secured to the body 11 by means of screws. The main function of this back cover 15 is to carry the above-stated packing 14 as will be further described later. In addition to that, the back cover 15 is arranged to prevent water drops from falling into the internal mechanisms of the camera body 11 from around the packing 14 when the back lid 13 is opened. The back cover 15 is provided with an aperture which is formed in the middle part of the cover 15 in a minimal size required for replacement of the film while the peripheral part of the cover 15 is arranged to cover the rear part of the camera body 11. Further details of this embodiment are as follows:

Again referring to FIGS. 6 and 7, the camera body 11 which is provided with the mechanisms and devices of the camera is inserted into the front cover 12 from the rear aperture thereof. An edge face 15a of the back cover is secured with screws to the rear surface of the camera body 11. With the back cover 15 thus set in position, a recess part is formed jointly by a stepped portion of the edge part 12a of the aperture of the front cover 12 and the peripheral edge part 15b of the back cover 15. Then, the recess part thus formed is filled with the packing 14. On the rear aperture of the front cover 12 is mounted the back lid 13 with the hinge shaft part 13c of the back lid 13 pivotally attached to the hinge shaft part 12b of the front cover 12. A water-tight effect is obtained with a rib 13a of the back lid 13 arranged to compress the packing 14 when the back lid 13 is closed. It goes without saying that the front cover 12 is provided with transparent protective members which are water-tightly attached to the front cover 12 at the photo-taking lens window part, etc. thereof. Recapitulation of the arrangement:

The edge part 12a of the aperture of the front cover 12 forms the outer half of the recess part which is to be filled with the packing 14. The inner half of the recess part is formed by the back cover 15 which is attached to the rear of the camera body 11. The packing 14 is thus carried jointly by the front cover 12 and the back cover 15. When the back lid 13 is closed, the rib 13a pushes the packing to bring about a water-tight effect.

A feature of this embodiment lies in that the front cover 12 is arranged to sustain only the outer half part of the recess filled with the packing 14 while its counterpart which is located on the inner side is sustained by the back cover 15. Compared with the conventional waterproof arrangement shown in FIG. 1, the arrangement of this embodiment permits the waterproof camera to be more compactly arranged. Further, in accordance with the arrangement of this embodiment, the inward protrudent part of the front cover 12 disappears to facilitate the molding work on the front cover 12, so that the cost of the camera can be lowered. It is another advantageous feature of the embodiment that the camera body 11 which includes the operating mechanisms and devices of the camera can be placed within the front cover 12 without leaving any wasteful space there. A further advantageous feature of the embodiment lies in that the rear of the camera body 11 is covered with the back cover 15 which is arranged to prevent the intrusion into the camera body 11 of water drops which fall toward the camera body 11 when the back lid 13 opens.

Figure 8:
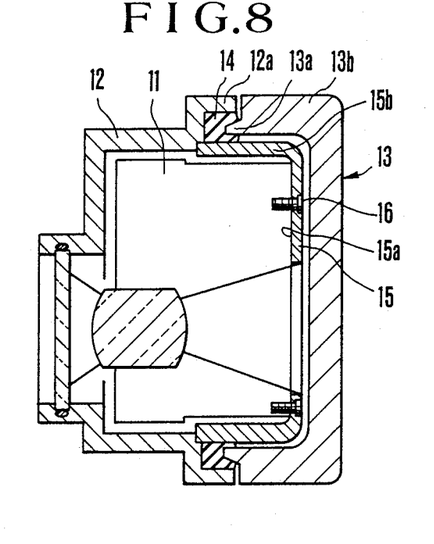
FIG. 8 is a sectional view showing a waterproof camera arranged according to this invention as a second embodiment thereof.

FIG. 8 shows a second embodiment of this invention in which the rigidity of the back lid 13 is increased without increasing the thickness thereof. In this case, the depth of the front cover 12 is shortened while the peripheral edge portion 13b of the back lid 13 is formed to extend toward the front cover 12 with a rib 13a formed at the fore end of the peripheral edge portion 13b of the back lid. Meanwhile, the end face 15a of a back cover 15 is secured by means of screws 16 to the rear face of the camera body 11. The peripheral edge part 15b of the back cover 15 is arranged to extend toward the front cover 12 to cover the exposed part of the camera body 11. A recess is formed jointly by the aperture forming edge part 12a of the front cover 12 and the peripheral edge part 15b of the back cover 15. The recess is filled with a packing 14. The second embodiment which is arranged in this manner has the back lid 13 arranged to increase its rigidity without increasing the thickness thereof. This is an advantage of the second embodiment in addition to the same advantageous features as those of the first embodiment described in the foregoing. Further, when the back lid 13 is opened, the back cover 15 covers the camera body 11 to effectively protect the camera body from water drops. This solves the problem of water drop intrusion into the camera body 11 which tends to happen when the back lid 13 opens particularly in cases where a waterproof camera is of the same shape as this embodiment.

Figure 9:
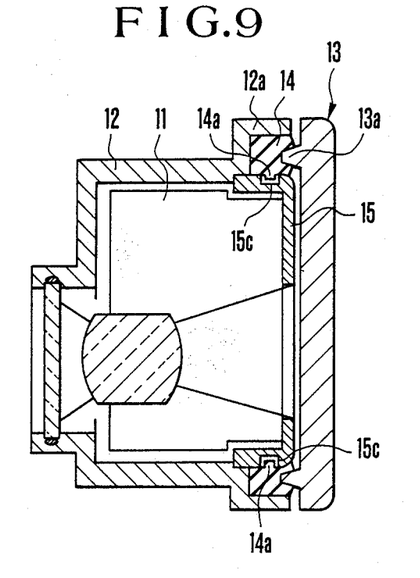
FIG. 9 is a sectional view showing a waterproof camera arranged according to this invention as a third embodiment thereof.
Figure 10:
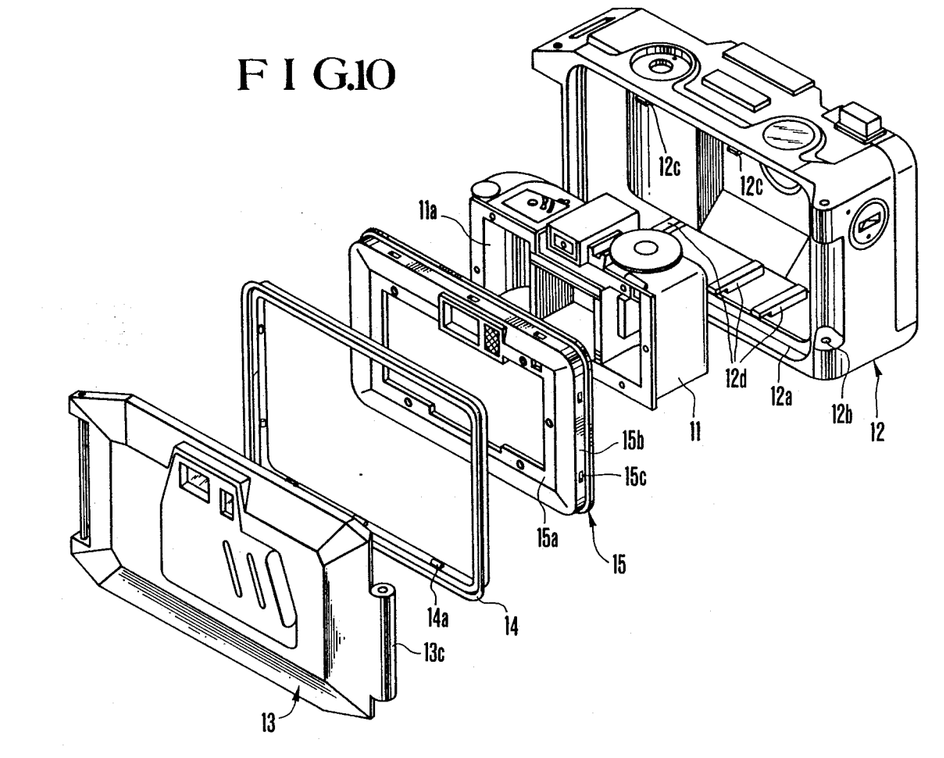
FIG. 10 is an exploded view of the waterproof camera shown in FIG. 9.

FIGS. 9 and 10 show a third embodiment of this invention. This embodiment is an improvement over the first embodiment shown in FIGS. 6 and 7. The side face of the back cover 15 which abuts on the packing 14 is provided with a plurality of slots 15c. The packing 14 is provided with a plurality of projections 14a which are arranged in positions corresponding to the slots 15c. This additional arrangement serves to prevent the packing from pulling out from the packing receiving recess part with the projections 14a engaging the corresponding slots 15c of the back cover 15 when the recess part is filled with the packing 14. Therefore, when the back lid 13 is opened, the packing 14 can be prevented without fail from coming off the position thereof. With the exception of this additional arrangement and the advantageous effect thereof, the rest of this embodiment are identical with the arrangement of the first embodiment shown in FIGS. 6 and 7 and thus require no further description. The interrelation of the projections 14a of the packing 14 and the slots 15c of the back cover 15 may be reversed for obtaining the same advantageous effect. In other words, the packing 14 may be provided with slots instead of the projections and the back cover 14 provided with projections instead of the slots 15c for preventing the former from pulling out.

Figure 11:
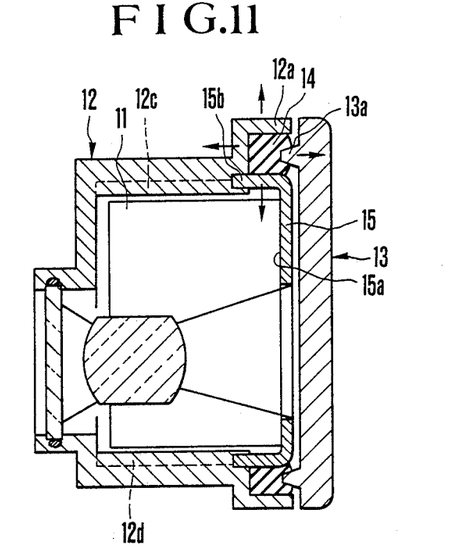
FIG. 11 is a sectional view showing a waterproof camera arranged according to this invention as a fourth embodiment of the invention.
Figure 12:
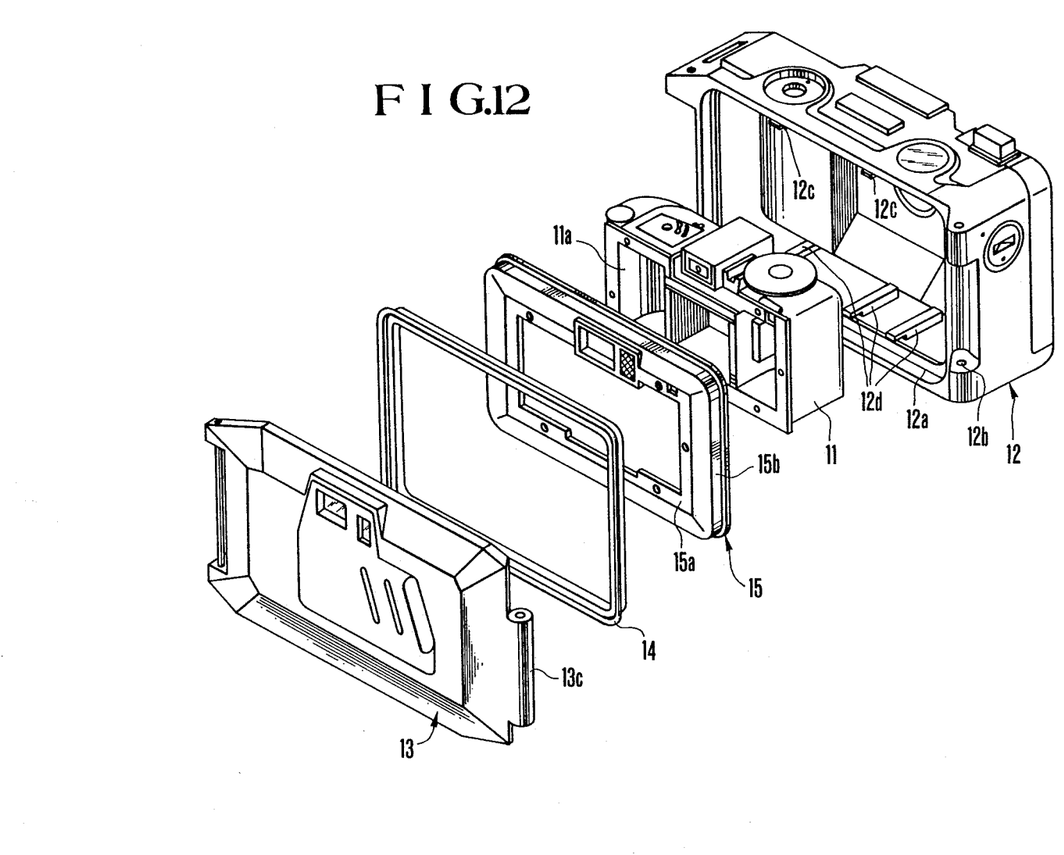
FIG. 12 is an exploded view of the waterproof camera shown in FIG. 11.
Figure 13:
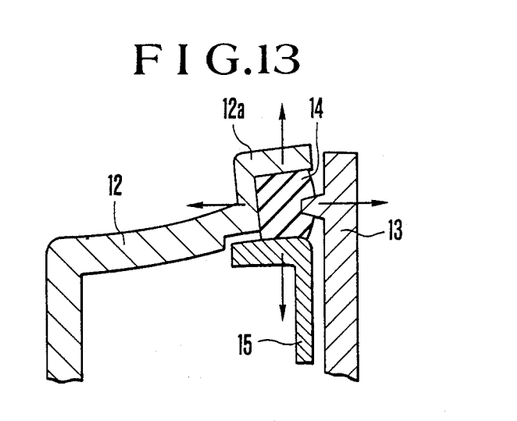
FIG. 13 is a sectional view showing the advantageous effect attainable by the fourth embodiment shown in FIG. 11.

FIGS. 11 and 12 show a fourth embodiment of this invention as another example of improvement over the first embodiment shown in FIGS. 6 and 7. In this case, a plurality of protrudent rails 12c and 12d are formed near to the middle parts of the upper and lower inner walls of the front cover 12. The outer edge part 15b of the back cover 15 is arranged to be fitted into recesses provided at the fore ends of these rails 12c and 12d. This additional arrangement of the fourth embodiment is intended to solve the following problem:

Referring to FIG. 13, with the first embodiment arranged as shown in FIGS. 6 and 7, the front cover 12 might be caused to warp as shown in FIG. 13 by the reaction of the packing 14 exerted in the directions of arrows. The warp then results in a gap between the front cover 12 and the back cover 15. This prevents the packing receiving recessed from having a perfect shape. Whereas, the additional arrangement of the fourth embodiment solves this problem.

More specifically, in the embodiment shown in FIGS. 11 and 12, the front cover 12 which forms the outer portion of the packing receiving recess part is provided with the protrudent rails 12c and 12d. Then, the outer edge part 15b which forms the inner portion of the packing receiving recess is arranged to be fitted into recesses formed at the fore ends of these rails 12c and 12d. The reaction of the packing which develops with the packing compressed when the back lid 13 is closed is then absorbed by the protrudent rails 12c and 12d, so that the front cover 12 can be prevented from warping. The rest of the arrangement of this embodiment is identical with the first embodiment.

In each of the first to fourth embodiments given in the foregoing, the packing receiving recess part is formed jointly by the front cover 12 and the back cover 15. It is a feature of this invention that the packing is carried by the front cover and the camera body which is provided with camera operating mechanisms and devices and also with the back cover 15 in the cases of the embodiments described. Therefore, in the event of a camera body 11 having no back cover 15, the packing 14 is arranged in accordance with this invention to be carried by the front cover and the camera body 11 instead of the back cover 15.

The invented arrangement to have the waterproof packing carried jointly by the front cover and the camera body which includes camera operating mechanisms permits reduction in size of the whole camera. Another advantage of the invention lies in that the front cover can be molded at a low cost.

What is claimed is:

1. A waterproof camera, comprising:
   (a) a camera body having camera operating mechanism;
   (b) a cover member for covering said camera body, said cover member being provided with an aperture;
   (c) a lid member positioned at said aperture of said cover member, said lid member being connected to said cover member in such a way as to uncover and cover said aperture by opening and closing;
   (d) a packing carrying part formed jointly by said camera body and said cover member; and
   (e) a packing carried by said packing carrying part, said packing being arranged to seal a junction between said cover member and said lid member by tightly contacting said lid member when said lid member is closed, said tight contact between said lid member and said packing being obtained by a rib formed on said lid member;
   (f) said packing carrying member being arranged to have a packing receiving recess formed jointly by said camera body and said cover member, said packing receiving recess being formed jointly by a flat end face of said camera body and a stepped part of the inner surface of said cover member.

2. A camera according to claim 1, wherein said cover member is formed into a box-like shape to cover the front and peripheral surfaces of said camera body.

3. A camera according to claim 1, wherein said aperture of said cover member is located on the film replacing side of said camera body.

4. A camera according to claim 3, wherein said cover member has said aperture thereof formed on the rear side of said camera body.

5. A camera according to claim 1, wherein said lid member is pivotally carried by said cover member.

6. A camera according to claim 1, wherein said packing is formed in a frame shape which coincides with the whole edge part of said aperture of said cover member.

7. A camera according to claim 1, wherein said lid member consists of a base face which roughly coincides with the aperture area of said cover member and a peripheral wall which perpendicularly extends from said base face.

8. A camera according to claim 1, wherein a portion of said cover member in the neighborhood of the part thereof corresponding to said packing carrying part engages said camera body in such a manner that any outward deformation of the cover member resulting from the compressed deformation of said packing is restricted by said engagement.

9. A waterproof camera, comprising:
   (a) a camera body having a camera operation mechanism;
   (a') a back cover arranged on the rear side of the camera body;
   (b) a cover member for covering said camera body, said cover member being provided with an aperture part formed on the side of said back cover;
   (c) a lid member positioned at said aperture of said cover member, said lid member being connected to said cover member in such a way as to uncover and cover said aperture by opening and closing;
   (d) a packing carrying part formed jointly by the back cover of said camera body and said cover member; and
   (e) a packing carried by said packing carrying part, said packing being arranged to seal a junction between said cover member and said lid member by tightly contacting said lid member when said lid member is closed, said tight contact between said lid member and said packing being obtained by a rib formed on said lid member;
   (f) said packing carrying part having a packing receiving recess part formed jointly by said back cover of said camera body and said cover member, said packing receiving recess part being formed jointly by a flat face portion of the back cover of said camera body and a stepped part of the inner surface of said cover member.

10. A camera according to claim 9, wherein said cover member is formed into a box-like shape to cover the front and peripheral surfaces of said camera body.

11. A camera according to claim 9, wherein said back cover is provided with an aperture which permits loading and replacing work on film.

12. A camera according to claim 9, wherein said lid member is pivotally carried by said cover member.

13. A camera according to claim 9, wherein said packing is formed in a frame shape which coincides with the whole edge part of said aperture of said cover member.

14. A camera according to claim 9, wherein said lid member consists of a base face which roughly coincides with the aperture area of said cover member and a peripheral wall which perpendicularly extends from said base face.

15. A camera according to claim 9, wherein said cover member is engaged with the back cover of said camera body in the neighborhood of a part thereof corresponding to said packing carrying part in such a manner that any outward deformation of said cover member resulting from a compress deformation of said packing is restricted by said engagement.

16. A waterproof camera, comprising:
 (a) a camera body having camera operating mechanisms;
 (b) a cover member for covering said camera body, said cover member being provided with an aperture;
 (c) a lid member positioned at said aperture of said cover member, said lid member being connected to said cover member in such a way as to uncover and cover said aperture by opening and closing;
 (d) a packing carrying part formed jointly by said camera body and said cover member; and
 (e) a packing carried by said packing carrying part, said packing being arranged to seal a junction between said cover member and said lid member by lighting contacting said lid member when said lid member is closed;
 (f) said packing carrying part being provided with slots for preventing said packing from moving in the direction of pulling out of place after said carrying part is filled with said packing.

17. A camera according to claim 16, wherein said packing is provided with retaining projections which are arranged in positions corresponding to said slots of said packing carrying part.

18. A waterproof camera, comprising:
 (a) a camera body having camera operating mechanisms and with a back cover attached to the rear side thereof;
 (b) a cover member for covering said camera body, said cover member being provided with an aperture part formed on the side of said back cover;
 (c) a lid member positioned at said aperture of said cover member, said lid member being connected to said cover member in such a way as to uncover and cover said aperture by opening and closing;
 (d) a recessed packing carrying part formed jointly by the back cover of said camera body and said cover member; and
 (e) a packing carried by said packing carrying part, said packing being arranged to seal a junction between said cover member and said lid member by lightly contacting said lid member when said lid member is closed;
 (f) said packing carrying part being provided with slots for preventing said packing from moving in the direction of pulling out of place after said carrying part is filled with said packing.

19. A camera according to claim 18, wherein said packing is provided with retaining projections which are arranged in positions corresponding to said slots of said packing carrying part.

20. A waterproof camera, comprising:
 (a) a camera body;
 (b) a front cover member for covering a front side of said camera body, said front cover member having a protrusion extending toward a back side of said camera body to cover the upper and lower and right and left portions of said camera, and an aperture on an inside of said protrusion;
 (c) a middle cover member for covering the back side of said camera body, said middle cover member having a protrusion to cover the upper and lower and right and left portions of the back side of said camera body, with at least a portion of the middle cover member which covers the back side of said camera body protruding to an inner side of the aperture of the front cover member;
 (d) a seal member arranged between the protrusion of said front cover member and the protrusion of said middle cover member;
 (e) a fixing member for fixing said middle cover member to said camera body, said fixing member being provided on a portion of said middle cover member which covers the back side of the camera body; and
 (f) an openable back lid arranged to cover the middle cover member and the fixing member.

21. A camera comprising:
 (A) a camera body;
 (B) a first cover for covering said camera body, said first cover having an aperture part for loading photosensitive means;
 (C) a lid for covering said aperture part;
 (D) sealing means for tightly closing said aperture part when said lid is closed; and
 (E) a second cover for covering said camera body, said second cover constituting a holding part for holding said sealing means together with said first cover.

22. A camera according to claim 21, wherein said second cover has an extended part which extends toward said aperture part.

23. A camera according to claim 21, wherein said holding part has a dislocation preventing part for preventing said sealing means from coming out of its place.

24. A camera according to claim 21, wherein said first cover and said second cover constitute such engaging state as not being deformed by a deformation of said sealing means.

25. A camera, comprising:
 (A) a camera cover having an aperture part for loading photosensitive means;
 (B) a lid for covering said aperture part for loading photosensitive means;
 (C) sealing means for tightly closing said aperture part when said lid is closed; and
 (D) a camera body covered by said camera cover, said camera body constituting together with said camera cover a holding part for holding said sealing means.

26. A camera according to claim 25, wherein said holding part has a dislocation preventing part for preventing said sealing means from coming out of its place.

27. A camera according to claim 25, wherein said camera cover and said camera body constitute such engaging state as not being deformed by a deformation of said sealing means.

28. A waterproof camera, comprising:
(A) a camera body;
(B) a front cover member for covering a front side of said camera body, said front cover member having a protrusion extending toward a back side of said camera body to cover the upper and lower and right and left portions of said camera, and an aperture on an inside of said protrusion;
(C) a middle cover member for covering the back side of said camera body, said middle cover member having a protrusion to cover the upper and lower and right and left portions of the back side of said camera body, with at least a portion of the middle cover member which covers the back side of said camera body protruding to an inner side of the aperture of the front cover member;
(D) a seal member arranged between the protrusion of said front cover member and the protrusion of said middle cover member;
(E) a fixing member for uniting said middle cover member and said camera body, said fixing member being provided on a portion of said middle cover member which covers the back side of the camera body; and
(F) an openable back lid arranged to cover at least a part of the middle cover member and the fixing member.

29. A waterproof camera, comprising:
(A) a camera body;
(B) a front cover member for covering a front side of said camera body, said front cover member having a protrusion extending toward a back side of said camera body to cover the upper and lower and right and left portions of said camera, and an aperture on an inside of said protrusion;
(C) a middle cover member for covering the back side of said camera body, said middle cover member having a protrusion to cover the upper and lower and right and left portions of the back side of said camera body, with at least a portion of the middle cover member which covers the back side of said camera body protruding to an inner side of the aperture of the front cover member;
(D) a seal member arranged between the protrusion of said front cover member and the protrusion of said middle cover member;
(E) a fixing member for fixing said middle cover member with respect to said camera body, said fixing member being provided with a portion of said middle cover member which covers the back side of the camera body; and
(F) an openable back lid arranged to cover at least a part of the middle cover member and the fixing member.

30. A camera, comprising:
(A) a camera body;
(B) a first cover for covering said camera body;
(C) a second cover for coving said camera body, said second cover having an aperture part for loading photosensititive means;
(D) a sealing member provided between said first cover and said second cover;
(E) a fixing member for uniting said second cover with said camera body; and
(F) a lid for covering said aperture part for loading photosensitive means.

* * * * *